United States Patent [19]
Freeman et al.

[11] Patent Number: 6,029,891
[45] Date of Patent: Feb. 29, 2000

[54] MAGNETIC PATTERN VERIFICATION SYSTEM

[75] Inventors: Carl J. Freeman, Rockville, Md.; Joshua J. Caron, Orono; Reichl B. Haskell, Veazie, both of Me.; Joseph R. Jahoda, Reston, Va.

[73] Assignee: Sensor Research & Development, Orono, Me.

[21] Appl. No.: 09/116,812

[22] Filed: May 29, 1998

Related U.S. Application Data

[63] Continuation of application No. 08/979,860, Nov. 26, 1997, abandoned, which is a continuation of application No. 08/902,630, Jul. 29, 1997, abandoned, and a continuation of application No. 08/903,489, Jul. 30, 1997, abandoned.

[51] Int. Cl.⁷ ..................................................... G06K 7/10
[52] U.S. Cl. ........................... 235/380; 235/375; 235/494
[58] Field of Search ...................................... 235/375, 454, 235/494, 380

[56] References Cited

U.S. PATENT DOCUMENTS

| | | |
|---|---|---|
| 2,983,354 | 5/1961 | Ember et al. . |
| 3,171,020 | 2/1965 | Lord . |
| 3,612,834 | 10/1971 | Ashiya et al. . |
| 3,755,652 | 8/1973 | Endo et al. . |
| 3,983,646 | 10/1976 | Howard . |
| 4,437,558 | 3/1984 | Nicholson et al. . |
| 4,581,525 | 4/1986 | Hortsmann . |
| 4,745,401 | 5/1988 | Montean . |
| 4,814,589 | 3/1989 | Storch . |
| 4,829,288 | 5/1989 | Eisenbeis . |
| 4,935,724 | 6/1990 | Smith . |
| 5,103,081 | 4/1992 | Fischer et al. . |
| 5,166,502 | 11/1992 | Rendelmann et al. . |
| 5,183,343 | 2/1993 | Tazawa et al. ........................... 235/375 |
| 5,216,234 | 6/1993 | Bell . |
| 5,258,735 | 11/1993 | Allwine . |
| 5,283,422 | 2/1994 | Storch et al. . |
| 5,361,885 | 11/1994 | Modler . |
| 5,395,181 | 3/1995 | Deeze et al. . |
| 5,406,264 | 4/1995 | Plonsky et al. . |
| 5,498,859 | 3/1996 | Farmont . |
| 5,515,447 | 5/1996 | Zheng . |
| 5,563,583 | 10/1996 | Brady . |

Primary Examiner—Harold I. Pitts
Attorney, Agent, or Firm—Pierce Atwood; Chris A. Caseiro

[57] ABSTRACT

An apparatus for reading radially patterned magnetic data from circular objects, such as tokens used by the gaming, transportation, entertainment and other industries. A method of reading the data from such a token.

14 Claims, 3 Drawing Sheets

MAGNETIC PATTERN VERIFICATION SYSTEM

CROSS-REFERENCE TO RELATED APPLICATIONS

This application is a Continuation of U.S. Ser. No. 08/979,860 filed Nov. 26, 1997 abandoned which in turn is a Continuation of U.S. Ser. No. 08/902,630 filed Jul. 29, 1997, abandoned the disclosures of which in their entireties are incorporated by reference thereto herein; and is a Continuation of U.S. Ser. No. 08/903,489 filed Jul. 30, 1997 abandoned.

STATEMENT REGARDING FEDERALLY SPONSORED RESEARCH OR DEVELOPMENT

Not Applicable

AUTHORIZATION PURSUANT TO 37 C.F.R. §1.71 (d) (e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a system for reading magnetically encoded, radially patterned data from a token, and more particularly to a system for the recognition and authentication of such tokens for use in the gaming, transportation and amusement industries. A system for scanning the token includes a magnetic reader head located adjacent a slot having multiple paths through which the token passes. A mechanism that directs the token to the appropriate location is provided within the slot.

2. Description of the Related Art

Magnetic media are used for security and identification on many applications. Tokens and chips are used by amusement, gaming and transportation industries among others.

For example, the gambling industry utilized gaming chips and tokens which are purchased by players at the casino and then used in the place of cash. Forged and counterfeit tokens and gaming chips are a serious problem in the industry.

Slot machines and other types of standard gaming systems have typically been configured to accept standard coins of the country or region in which they operate. A number of different types of systems have been developed for accepting and verifying the authenticity of various types of coins, as well as a number of different types of resident specific tokens which may be used in the machines in place of coins. Tokens are generally identical in size and weight to one type of coin, such as the large American Eisenhower dollar, and are assigned various denominations by the issuing establishment, where they may be used as an alternative form of tender. In general, these tokens have no legally recognized value in commerce outside of the issuing establishment.

As the demand for such tokens has risen, and the denomination of such tokens has been increased by the issuers, so has the incidence of counterfeiting. Hence, the design and manufacture of the tokens and the corresponding systems for detecting the authenticity of these tokens have become increasingly more sophisticated. A conventional coin comparator is manufactured by Coin Mechanisms, Inc., of Elmhurst, Ill. Coin Mechanisms' Coin Comparitor Model CC-40 operates by optically comparing an input coin with an appropriate sample of that same type of coin.

Since similar sized chips are used by many different gaming establishments, the chips have been marked in different ways to distinguish between issuers. Typically, the markings on the chips have only indicated the issuing establishment and the chip's denomination. In order to further distinguish between chips and aid in the sorting of different chips, CHIPCO International Incorporated developed the Craftmanchip Series gaming chips, which are imprinted with an invisible ultraviolet bar code.

The invisible bar code used by CHIPCO is a linear bar code that is imprinted across the front or back face of the chip and which can be automatically scanned by an ultraviolet bar code scanner. Linear bar codes are also used on a wide variety of items, other than gaming chips, to convey a diverse variety of information. To read a linear bar code imprinted on a chip, it is first necessary to align the chip such that the bar code passes the bar code reader such that the bar code can be successfully read. Aligning a circular or disk-shaped object such as a chip so that the chip may pass by a sensor in a linear direction without angular motion is difficult and greatly restricts the type of reading system which can be sued with such chips. In addition, since ultraviolet imprinted chips cannot be visually inspected by players before they accept the chips, the players will be hesitant to accept them because the players have no way of visually determining if they are valid or remain valid after accepting the.

Magnetically encoded identification cards and the like have also been used in the gaming industry, such as then Gaming Data System customer identification cards of Dearborn Computer Company of Nevada in Las Vegas, Nev. Magnetic encoding has not found application in gaming chips because of the sensitivity of the magnetic material and the misuse typically imparted on such chips.

U.S. Pat. No. 5,103,081 is directed to an apparatus and method for reading data encoded on circular objects, such as gaming chips.

As claimed in the '081 patent the apparatus for reading and authenticating the validity of a gaming chip includes: a chip reducing area located within the apparatus; means for positioning and rotating the chip about the central axis while the chip is disposed within the chip reading area; means for reading the indicia when the chip is rotated in the reading area and outputting a first signal corresponding to the indicia; and means for receiving and analyzing the first signal an outputting and accept or reject signal; and means for moving the chip into either an accepted or a rejected position in response to the accept or reject signal.

As claimed in the '081 patent, the method for reading or authenticating a gaming chip involves positioning the chip in a reading position so as to allow the chip to be rotated about the central axis; reading the indicia from the chip when the chip is rotated in the reading position and developing a first signal corresponding to the data bit information of the chip; and receiving the first signal and analyzing the first signal to determine whether the chip is accepted or rejected.

The ability to scan chips on a gaming table, as well as tokens used in slot machines, for their value and authenticity, would benefit casinos in reducing fraud and improving their management of gambling operations.

Accordingly, the ability to manufacture tokens and chips with an effective discriminating covert marking system to identify chips by denomination, house ownership, and chip-specific serial numbers, would provide advantageous results in overcoming such problems.

RF tags, coil/UV capacitors, and electromagnetic codes also have been proposed to solve such problems. However, none have yet resulted in a successful solution identifying gambling chips and tokens.

Problems with these technologies include the fact that tokens must withstand pressures of about 800 psi and temperatures within the range of about 400°–600°. In addition, the surfaces of tokens must be available for printing of custom-designed patterns/colors, casino name, and token value, leaving only 0.030" of token thickness in which to place the encoding structure.

The most successful technology to date for recognition and/or authentication of tokens while meeting these requirements, is the use of static magnetic patterns radially encoded onto thin magnetic substrates or with magnetic ink.

Those concerned with these and other problems recognize the need for a static magnetic pattern verification system for reading magnetically encoded, radially patterned data from tokens for use in the gaming, transportation and amusement industries.

BRIEF SUMMARY OF THE INVENTION

The present invention is directed to a static magnetic pattern verification system for reading magnetically encoded, radially patterned data from tokens for use in the gaming, transportation, amusement and other industries.

Therefore, an object of the present invention is the provision of an improved static magnetic pattern verification system.

Another object of the invention is to improve the method in which casino chips are authenticated and sorted in order to prevent counterfeiting and fraud and simplify the manner in which casino chips are sorted.

Another object of the invention is to provide a system and method for authenticating and/or sorting casino chips based on magnetic encoding and reading.

Another object of the invention is to provide an improved magnetic reader for reading magnetically encoded casino chips.

These and other objects of the invention are accomplished by providing a magnetic reader and associated circuitry which can be used to read encoded information and perform desired processes based thereon.

According to one embodiment of the invention, a magnetic reader is provided that can read information by causing relative movement between the casino chip and the reader. Preferably, the information can be read while the casino chip is in motion without the need for comparison with a standard casino chip located in the reader.

A system and method for authenticating and/or sorting casino chips may include a plurality of magnetically encoded casino chips and at least one magnetic reader including a mechanism for causing relative movement between a casino chip and a magnetic read head, wherein the magnetic read head outputs information read from the casino chip to processing circuitry to authenticate and/or sort casino chips based on the magnetically encoded information on the casino chips.

The magnetic reader may have a single head or more than one head, can read one side of a casino chip or more than one side, may be configured into the desired ring pattern, may be movable or stationary and of the contacting or non-contacting type.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein.

DETAILED DESCRIPTION OF THE INVENTION

Figure 1:
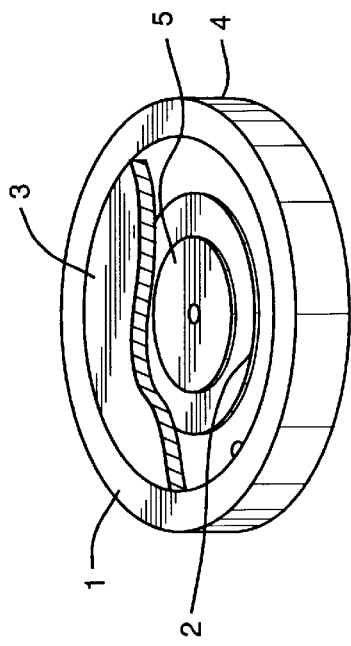
FIG. 1 is a view of a typical token to be used with the present invention.

Referring now to the drawings, wherein like reference numerals designate identical or corresponding parts throughout the several views, which show the invention depicted generally.

The present invention is directed to a token or chip which can be readily identified as to denomination and source; and an apparatus and method for doing so.

FIG. 1 is a view of a typical token to be used with the present invention. The token consists of metallic, ceramic and/or plastic body (1) shaped as a coin. Overlaid upon the token is a series of concentric rings of magnetic ink (2) or some other means of providing a radially symmetric signal of varying magnetic intensity. A metallic or plastic overlay (3) is then injection-molded over the top of the magnetic rings.

An illustrative example of a token suitable for purposes of the present invention is disclosed in U.S. Pat. No. 5,103,081; e.g., at column 1, line 58–column 4, line 22, the disclosure of which is incorporated by reference thereto herein.

Tokens are assigned a monetary value by a particular issuer and may be used to place wagers in a wide variety of games of chance in a side variety of gaming machines, such as slot machines or other coin-operated type machines. The appropriate diameter of tokens is 1.418 inches.

Tokens are particularly suitable for use in accordance with the present invention. Preferred for purposes of the present invention are tokens in size and weight to an American Eisenhower dollar coin. Preferably, tokens are intended to have identical markings on either side so that the same information can be read from either side. Gaming chips are typically made from metal, a hard plastic, or from hard-packed clay which can be colored and shaped in accordance with a design mold. Tokens have an outer rim portion (4) and an inner portion (5) which are separated by concentric rings of magnetic ink (2).

The means for providing a radially symmetric signal to varying magnetic intensity; e.g., concentric rings of magnetic ink (2), may be created from a permanently imprinted circular band of plastic having an adhesive backing for securing it. The depth of the groove and the thickness of circular bar code are such that the top and bottom surfaces of the token are smooth and flush when bar code is in place. Alternatively, each token could be created from a mold which is uniquely designed so as to form bar encoded regions within the chip's surface. Although such a token would prevent circular bar code form being removed and tampered with, it would also typically increase the cost of producing the chips in mass quantities.

The means for providing a radially symmetric signal to varying magnetic intensity; e.g., concentric rings of magnetic ink (2), may be divided into individual sectors, but these sectors may be electronically combined to form sectors of various sizes. Each sector contains indicia representative of a plurality of data bits, which in turn serve to identify the token. The indicia, or bits, may be colored or uncolored to indicate whether the bit is a binary one or zero. For instance, when illustrated on white paper using black ink for the drawing, black indicia could be assigned a binary zero and white indicia could be assigned a binary one. Typically, a binary encoded bit is utilized to indicate that a condition associated with that bit is either "on" or "off", i.e., a white bit means the condition is on and a black bit means the condition is off. The status of the condition and the binary value of the bits can be arbitrarily designated in accordance with the logic principles governing the electronic interpretation of the information contained within the circular bar code.

In a currency sector, a plurality of data bits are coded so as to indicate the currency type of the token. For example, the code conveyed by the data bits may indicate that the token is in dollars, or francs or yen. Denomination sector is encoded to convey the denomination of the token, such as one, five or ten dollars. Casino identification sector is encoded to convey the number which is utilized to identify the particular gaming establishment which has issued and will honor the chip. Serial number sector is encoded to convey the unique serial number which is assigned to that particular chip.

A chip validator for reading and verifying the authenticity of a token in accordance with an embodiment of the present invention will now be described. The validator is positioned within a gaming machine (not shown) by suitable means for connection. For example, a bracket may be affixed to a side of a plate and by screws within the gaming machine. Also affixed to the side of the plate may be token guides secured by screws. A cover plate may be positioned over the opening between guides secured by screws which also serve to hold the guides in place. The cover plate most preferably has a semicircular cut-out at its top so that tokens may be inserted into the gaming machine.

When the token is inserted into the gaming machine, it is typically guided into the reading area (24) of the validator. A lockout pin may be positioned so as to be substantially centered within a lockout pin hole which extends through back plate.

When lockout pin is in its normally actuated-in position, the token will be guided into the reading area of validator. When the token enters the reading area (24), it is positioned within the detection range of a sensor. The sensor is capable of reading the encoded information imprinted on the token.

After the validator has read the information encoded on the token, the validator's control system processes the information and indicates to the validator whether the token is to be accepted or rejected. If the token is to be accepted, an open passage is created between token guides through which an accepted chip may pass. A slide bar is moved within a slide bar slot in the same direction so as to clear an opening amongst any previously accepted tokens which would have prevented the presently accepted token from dropping down into the bracket.

Initially, an accepted token will drop onto the upper surface of a slide bar after being pushed out of the reading position, and will stay on top of slide bar until the slide bar is moved back to its normally withdrawn position. When the slide bar is moved to its normal position, the accepted token then drops down onto bracket and into the opening which was created for the accepted token. When another token is accepted by the machine, the previously accepted token will then be moved out of the way by the slide bar.

If the token is to be rejected, an open passage is created between token guides so that the rejected token can drop onto the bracket.

Tokens can be rejected for a wide variety of different reasons, and for each different reason, a different response may be generated by the validator control system.

A security tone could be used as a unique signal that would be readable by only certain systems. In this manner, casinos could further monitor the casino chips and for example prevent unauthorized removal of casino chips from the casinos or certain areas of the casinos.

In accordance with the present invention, the apparatus for reading a token, the method for reading magnetically encoded data from a token and the reader system of the present invention, the type of security signal which is readable is not limited to the use of an audible signal. The present invention may process magnetically activated signals or possibly a video signal.

The machine could also be programmed to activate a tilt light or fault light, which would help to distinguish between good faith and bad faith players.

The validator's control system could also possess the ability to match the serial number of the chip being read and to compare that serial number with a lookup table of serial numbers stored in an externally or internally located memory. This feature would allow the machine to determine whether the serial number matches a known serial number issued by that casino and whether the currency, denomination and casino identification numbers are correct for that particular token.

Although a token is preferred for purposes of the present invention, and is used in describing the present invention, other forms, such as gaming chips, table checks, checks, and coins are suitable for purposes of the present invention.

Figure 2:
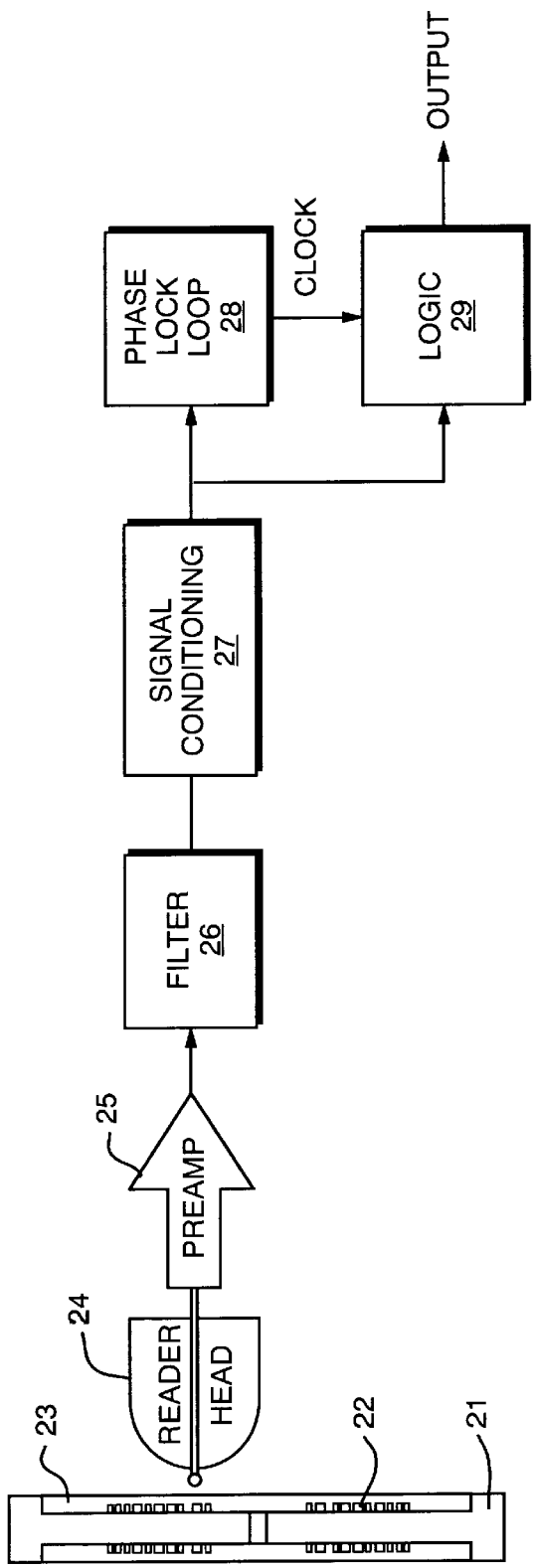
FIG. 2 is a block diagram of the circuit.

FIG. 2 shows a block diagram of the apparatus of the present invention, also referred to herein as "the validator", for reading the magnetic signal from the token for authentication or sorting purposes, where the data from the token is stored digitally, such that the existence of an ample magnetic field at any point along the radius of the token constitutes a "1" and the lack of the field constitutes a "0:. The token or coin, shown in side profile (21, 22, 23), passes by a magnetic tape reader head (24). The motion of the magnetic field radiating from the token passing by the reader head induces an electrical current which is amplified by a preamplifier (25) and passed through a band-pass filter (26) to lower the total noise power spectral density. The resulting low-noise electrical signal is then converted by a signal conditioning circuit block (27) to a serial digital bitstream. The first bits of data in the data stream, representing a series of alternating "1"s and "0"s, are used to generate a clock signal with a phase lock loop (28) for the timing of the logic circuitry (29) to convert the remainder of the serial data stream to a parallel word of information and make a keep-reject decision based upon the value of the word, The use of the phaselock loop (PLL) to generate the clock signal allows for wide variations in the speed at which the token passes the magnetic reader, thus eliminating the need for mechanical apparatus to control the speed of the token.

Figure 3:
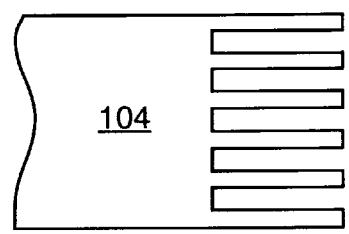
FIG. 3 is a side view of a magnetic head in accordance with an embodiment of the present invention.
Figure 4:
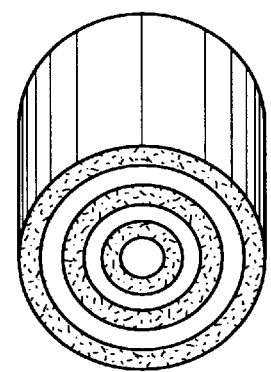
FIG. 4 is a bottom view of the head illustrated in FIG. 3.

As illustrated in FIGS. 3 and 4, the magnetic reader head 104 is in the shape of a casino chip although other shapes may also be used. The head 104 may also be designed to mirror the pattern of the rings 2. The head 104 could be configured in a form matching the rings of the chip.

Figure 5:
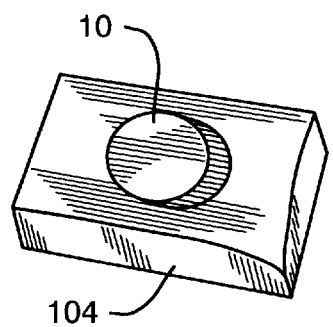
FIG. 5 is a side view of the flat surface magnetic reader head in accordance with one embodiment of the invention.

It is possible for the casino chip 1 or 10 to remain stationary and to move the head 110 (FIG. 5). The head 110 could comprise a flat surface that is passed over a casino chip 10 either manually or automatically much in the same manner as a bar code scanner is passed over a bar code. Alternatively, the flat surface reader head 110 may be held stationary and the casino chip 1 or 10 passed either manually or automatically over the head 10.

Although only one magnetic reader head 104 is shown, it is understood that additional heads may be provided either on the same or opposite side of the slot as the first head in the event that the casino chip 1 or 10 is provided with encoding on both sides such that both faces may be scanned simultaneously or with multiple types of encoding. In this manner, the amount of processing time is decreased and the number of casino chips scanned is increased. It should also be noted that although the description has focused on magnetic rings and magnetic read heads, other types of rings/reading heads (e.g., electrical, optical, etc.) May be used with various aspects of the invention. Furthermore, the head 104 could be of a contacting or non-contacting type.

Figure 6:
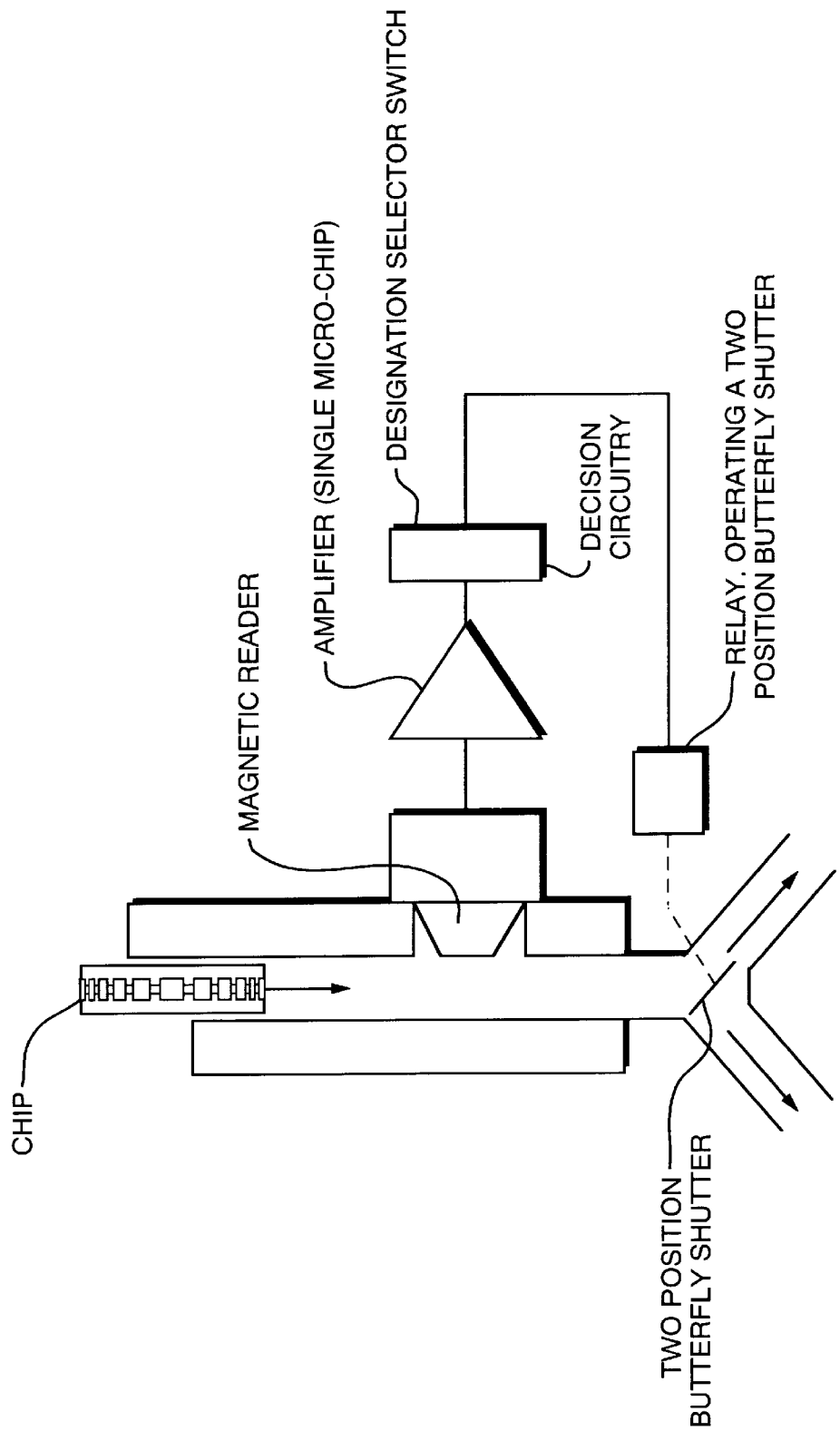
FIG. 6 is a schematic illustration of a magnetic reader according to one embodiment of the present invention.

Referring to FIG. 6, there is provided a system 100 for reading magnetically encoded casino chips. The system 100 includes a slot 102 having at least two paths into which the casino chip is inserted. As the casino chip 1 or 10 slides through the slot 102, it passes a magnetic reader head 104. The magnetic reader head 104 scans the magnetic rings 2 or 12 on the casino chip 1 or 10 and processes the information encoded thereon to determine the authenticity and/or denomination and other information pertaining to the casino chip 1 or 10. Once the determination has been made according to the authenticity and/or denomination (and other information) of the casino chip 1 or 10, decision circuitry 106 may be used to determine the ensuing path for the casino chip 1 or 10. For example, depending on the information encoded on the casino chip 1 or 10, the decision circuitry 106 will operate one or more switch mechanisms 108 for selecting the path that the casino chip 1 or 10 will follow. Casino chips determined not to be authentic may be directed to a location separate from chips that are determined to be authentic. Of the chips that are determined to be authentic, subsequent switch mechanisms 108 may be used to separate the chips by value, issuing casino or other criteria.

In accordance with the present invention, an advanced Static Magnetic Pattern Verification System has been developed, which can positively identify modified slot machine tokens by denomination and casino.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents but also equivalent structures.

What is claimed is:

1. An apparatus for reading a token having magnetically readable data encoded thereon, the apparatus comprising:

a token reading area;

means for positioning the token within said token reading area;

means for reading the magnetically readable data on the token without requiring rotation of the token in order to read the data, and outputting a signal corresponding to the magnetically readable data;

means for receiving and analyzing said signal and outputting an accept or reject signal; and means for moving said token into either an accepted position or a rejected position in response to said accept signal or said reject signal, respectively.

2. The apparatus of claim 1, wherein said means for reading includes a magnetic tape reader head.

3. The apparatus of claim 2, wherein said means for receiving and analyzing said signal includes an amplifier for amplifying electric current induced by the token passing by said magnetic tape reader head.

4. The apparatus of claim 1, wherein said means for receiving and analyzing said signal includes a band-pass filter to lower total noise power spectral density of amplified electric current to generate a low-noise electrical signal.

5. The apparatus of claim 4, comprising a signal conditioning circuit block for converting said low-noise electrical signal to a series digital bitstream.

6. The apparatus of claim 5, comprising a phase lock loop for generating a clock signal from initial bits of data in said digital bitstream.

7. The apparatus of claim 6, comprising a logic circuit for converting bits other than said initial bits of data in said digital bit stream to a parallel format.

8. The apparatus of claim 7, wherein said logic circuitry is timed by said clock signal.

9. The apparatus of claim 8, wherein a keep-reject decision is made based on a value of said word.

10. A casino chip reader system for reading magnetically encoded information associated with a casino chip, the system comprising:

a slot region for receiving the casino chip, said slot region including at least two paths;

a magnetic head positioned within said slot region for reading the magnetically encoded information on a side of the casino chip as the casino chip passes through said slot region without requiring rotation of the casino chip to read the information;

decision circuitry operatively connected to said magnetic head; and switch means positioned ahead of said at least two paths and operatively connected to said decision circuitry, wherein said decision circuitry is designed to control movement of said switch so as to direct movement of the casino chip to one of said at least two paths as a function of the magnetically encoded information.

11. The casino chip reader system of claim 10, wherein said magnetic head is a first magnetic head and the side of the casino chip is a first side, the system further comprising a second magnetic head positioned within said slot region opposite said first magnetic head so as to read the magnetically encoded information on a second side of the casino chip.

12. The casino chip reader system of claim 11, wherein said magnetic heads are non-contacting magnetic heads.

13. The casino chip reader system of claim 11, wherein said magnetic heads are contacting magnetic heads.

14. The casino chip reader system of claim 11, wherein said magnetic heads are patterned.

* * * * *